United States Patent
Chung et al.

(10) Patent No.: US 12,385,550 B1
(45) Date of Patent: Aug. 12, 2025

(54) CYCLOID SPEED REDUCER

(71) Applicant: Delta Electronics, Inc., Taoyuan (TW)

(72) Inventors: Chi-Wen Chung, Taoyuan (TW); Wei-Ying Chu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 18/825,898

(22) Filed: Sep. 5, 2024

Related U.S. Application Data

(60) Provisional application No. 63/631,617, filed on Apr. 9, 2024.

(30) Foreign Application Priority Data

Aug. 16, 2024 (CN) .......................... 202411127815.6

(51) Int. Cl.
  *F16H 1/32* (2006.01)
  *F16H 57/021* (2012.01)

(52) U.S. Cl.
  CPC ............. *F16H 1/32* (2013.01); *F16H 57/021* (2013.01); *F16H 2001/323* (2013.01)

(58) Field of Classification Search
  CPC ................. F16H 1/32; F16H 2001/323; F16H 2001/327; F16H 57/029; F16H 2001/325
  See application file for complete search history.

(56) References Cited

U.S. PATENT DOCUMENTS

| | | |
|---|---|---|
| 6,492,787 B1 | 12/2002 | Hibino et al. |
| 7,988,581 B2 | 8/2011 | Kobayashi |
| 9,556,933 B2 | 1/2017 | Fujimoto |
| 9,976,629 B2 | 5/2018 | Shen |
| 10,673,304 B2 | 6/2020 | Tsai et al. |
| 10,677,321 B2 | 6/2020 | Tsai et al. |
| 11,486,469 B2 * | 11/2022 | Chung ............... F16H 1/32 |
| 11,555,531 B1 * | 1/2023 | Chung ............... F16H 1/34 |
| 11,841,073 B2 * | 12/2023 | Kihira ............. F16H 57/0471 |
| 2019/0207470 A1 | 7/2019 | Uematsu et al. |

FOREIGN PATENT DOCUMENTS

| | | | | |
|---|---|---|---|---|
| CN | 103968009 A | * | 8/2014 | ............. F16H 1/32 |
| CN | 105020345 A | * | 11/2015 | ............. F16H 1/32 |
| CN | 107237866 A | * | 10/2017 | |

(Continued)

*Primary Examiner* — Sherry L Estremsky
(74) *Attorney, Agent, or Firm* — KIRTON McCONKIE; Evan R. Witt

(57) ABSTRACT

A cycloid speed reducer is disclosed. The accommodation space required for the sealing component is integrated into the track ring to save the material costs and significantly reduce the overall volume. Moreover, a spacer ring is placed between the front bearing and the rear bearing, and the thickness of the spacer ring can be used to adjust the clearances of the front bearing and the rear bearing to facilitate the quantitative production and control the yield. On the other hand, the initial shape of the output plate is adjusted through mass production molding, and the thickness next to the protruding structures of the output plate is increased, so that the supporting plane can be milled through a lower-cost lathe processing, and the accuracy of bearing plane can meet the requirements. There is no need to perform full-circle milling on the output plate, and the processing hours are reduced significantly.

10 Claims, 8 Drawing Sheets

(56) References Cited

FOREIGN PATENT DOCUMENTS

| | | | | | |
|---|---|---|---|---|---|
| CN | 107387677 | A | * | 11/2017 | ............... F16H 1/32 |
| CN | 108019471 | A | * | 5/2018 | ............... F16H 1/32 |
| CN | 110185748 | A | * | 8/2019 | ............... B25J 17/00 |
| CN | 111853167 | A | * | 10/2020 | ............... F16H 1/32 |
| CN | 114251418 | A | * | 3/2022 | |
| CN | 115126845 | A | | 9/2022 | |
| CN | 115431254 | A | | 12/2022 | |
| CN | 115461968 | A | | 12/2022 | |
| CN | 116221345 | A | * | 6/2023 | |
| CN | 117722482 | A | | 3/2024 | |
| CN | 117869543 | A | * | 4/2024 | ............... F16H 1/32 |
| DE | 102017126737 | A1 | * | 5/2019 | ............... F16H 1/32 |
| GB | 2579204 | A | | 6/2020 | |
| TW | 201627589 | A | | 8/2016 | |
| TW | 202200330 | A | | 1/2022 | |
| TW | 202407236 | A | | 2/2024 | |

* cited by examiner

CYCLOID SPEED REDUCER

CROSS-REFERENCE TO RELATED APPLICATION

This application claims the benefit of U.S. Provisional Application No. 63/631,617 filed on Apr. 9, 2024, and entitled "CYCLOID SPEED REDUCER ASSEMBLY". This application claims priority to China Patent Application No. 202411127815.6, filed on Aug. 16, 2024. The entireties of the above-mentioned patent applications are incorporated herein by reference for all purposes.

FIELD OF THE INVENTION

The present disclosure relates to a speed reducer, and more particularly to a cycloid speed reducer optimizing the component structure to realize the miniaturization application.

BACKGROUND OF THE INVENTION

Currently on the market, the speed reducers commonly used in robotic arms can be roughly divided into two structural types: "cycloid speed reducer" and "harmonic speed reducer". Both of these reducers are lightweight, compact and have high reduction ratio characteristics.

The harmonic speed reducer includes a wave generator, a flexible gear and a rigid gear. The elastic deformation of the flexible gear can be controlled to result in a pushing action so as to transmit motion and power of mechanical transmission. The harmonic speed reducer has smaller size, lighter weight and higher precision when compared with the RV reducer. However, since the rigidity of the flexible gear of the harmonic speed reducer is low, the harmonic speed reducer is unable to withstand high impact and has a problem of causing teeth difference friction. In other words, the use life of the harmonic speed reducer is shorter.

Conventionally, the cycloid speed reducer includes an eccentric shaft and two cycloid discs. Each of the two cycloid discs includes at least one tooth. Moreover, the two cycloid discs are linked with a power input shaft and a power output shaft, respectively. During operations of the cycloid speed reducer, one cycloid disc is rotated with the power input shaft through the eccentric shaft, and the power output shaft is rotated with the other cycloid disc. Through the corresponding teeth, the two cycloid discs are correspondingly rotated. The conventional cycloid speed reducer has many benefits such as high transmission ratio, compact structure and high transmission efficiency. However, compared with the harmonic speed reducer, the conventional cycloid speed reducer still has a larger size and is not conducive to miniaturization.

Therefore, there is a need of providing a cycloid speed reducer optimizing the component structure to realize the miniaturization application, so as to the overcome the above drawbacks.

SUMMARY OF THE INVENTION

An object of the present disclosure is to provide a cycloid speed reducer optimizing the component structure to realize the miniaturization application. In order to achieve the sealing design of the front end and the rear end of the cycloid speed reducer of the present disclosure, the accommodation space required for the sealing element is integrated into the track ring, and the traditional end cover design is omitted to save the material costs and significantly reduce the overall volume of the cycloid speed reducer. Moreover, in order to prevent the front bearing and the rear bearing of the input shaft from affecting the transmission due to installation clearance errors, a spacer ring is placed between the front bearing and the rear bearing, and the thickness of the spacer ring can be used to adjust the clearances of the front bearing and the rear bearing to facilitate the quantitative production and control the yield. On the other hand, the position-limitation of the gear plate in the cycloid reducer usually relies on the output plate or the track ring to act as the supporting and limiting parts. In the present disclosure, the initial shape of the output plate is adjusted through mass production molding, and the thickness next to the protruding structures of the output plate is increased, so that the supporting planes can be milled through a lower-cost lathe processing, and the accuracy of supporting plane can meet the requirements. There is no need to perform full-circle milling on the output plate, and the processing hours are reduced significantly. In this way, by optimizing the aforementioned component structure, the cycloid speed reducer of the present disclosure not only achieves miniaturization application, but also saves the material and manufacturing costs.

In accordance with an aspect of the present disclosure, a cycloid speed reducer is provided, and includes an input shaft, a cycloidal gear plate, a roller wheel assembly, an output plate, a track base and a sealing element. The input shaft is arranged along an axial direction. The cycloidal gear plate includes a shaft hole and an outer tooth portion, wherein the shaft hole passes through the cycloidal gear plate along the axial direction, and is configured to be passed through by the input shaft, and the outer tooth portion is disposed on an outer periphery of the cycloidal gear plate. The roller wheel assembly is sleeved on the cycloidal gear plate and includes a plurality of rollers spatially corresponding to the outer tooth portion of the cycloidal gear plate. The output plate is connected to the cycloidal gear plate through an eccentric transmission shaft, wherein when the input shaft drives the outer tooth portion of the cycloidal gear plate to engage with the corresponding rollers of the roller wheel assembly, the cycloid gear plate is rotated with the eccentric transmission shaft, so that the output plate is driven by the eccentric transmission shaft to rotate. The track base is disposed on an outer side of the roller wheel assembly, and spatially corresponding to an outer peripheral wall of the output plate, wherein the track base is extended outward along the outer peripheral wall of the output plate to form an accommodation space between the track base and the outer peripheral wall of the output plate. The sealing element is received within the accommodation space and tightly fitted between the track base and the output plate.

In an embodiment, the cycloid speed reducer further includes a roller bearing, wherein the roller bearing is arranged between the output plate and the track base, and includes a plurality of rollers configured to run between the track base and the output plate.

In an embodiment, the track base is spatially corresponding to the output plate, and a parallelogram is collaboratively formed on a radial section so that the plurality of rollers of the bearing roller are configured to run between the track base and the output plate.

In an embodiment, the track base includes a groove, which is ring-shaped on an inner peripheral wall of the track base and configured to engage with an outer peripheral edge of the sealing element.

In an embodiment, the cycloid speed reducer further includes a deep groove bearing, a needle bearing and a spacer ring, wherein the input shaft includes a deep-groove-bearing connection section and a needle-bearing connection section, the deep groove bearing is connected between the deep-groove-bearing connection section and the output plate, the needle bearing is connected between the needle-bearing connection section and the cycloidal gear plate, and the deep groove bearing and the needle-bearing connection section are connected through the spacer ring.

In an embodiment, the spacer ring includes a first spacer section and a second spacer section connected to each other along the axial direction to form a stepped structure.

In an embodiment, an inner ring of the deep groove bearing interferes with the first spacer section for bearing, and the second spacer section interferes with the needle-bearing connection section for bearing.

In an embodiment, the first spacer section has a first spaced outer diameter, the second spacer section has a second spaced outer diameter, and the first spaced outer diameter is less than the second spaced outer diameter.

In an embodiment, the deep-groove-bearing connection section has a deep-groove-bearing inner diameter, the needle-bearing connection section connected to the needle bearing has a needle-bearing inner diameter, and an eccentricity value is formed by the relative distance between a central axis of the needle-bearing connection section and a central axis of the deep-groove-bearing connection section, wherein the first spaced outer diameter is greater than the sum of the deep-groove-bearing inner diameter and 1.5 mm, and is less than or equal to the needle-bearing inner diameter, wherein the second spaced outer diameter is greater than the sum of the first spaced outer diameter and 2 times the eccentricity value, and is less than or equal to the sum of the needle-bearing inner diameter, the difference between the needle-bearing inner diameter and the deep-groove-bearing inner diameter and 2 times the eccentricity value.

In an embodiment, the output plate includes a plurality of protruding structures and a plurality of supporting planes, the plurality of protruding structure are disposed on a datum plane, and the plurality of supporting planes are correspondingly connected to the plurality of protruding structures and higher than the datum plane.

In an embodiment, the plurality of supporting planes are formed after a plurality of milling outreach structures for increasing thickness of the plurality of protruding structures are removed through milling, and the plurality of supporting planes are spaced apart from each other and configured to support a bottom surface of the cycloidal gear plate.

In an embodiment, the output plate includes a first output plate and a second output plate, the first output plate and the second output plate are respectively located on two opposite outer sides of the roller wheel assembly, and each provides a power output, respectively.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
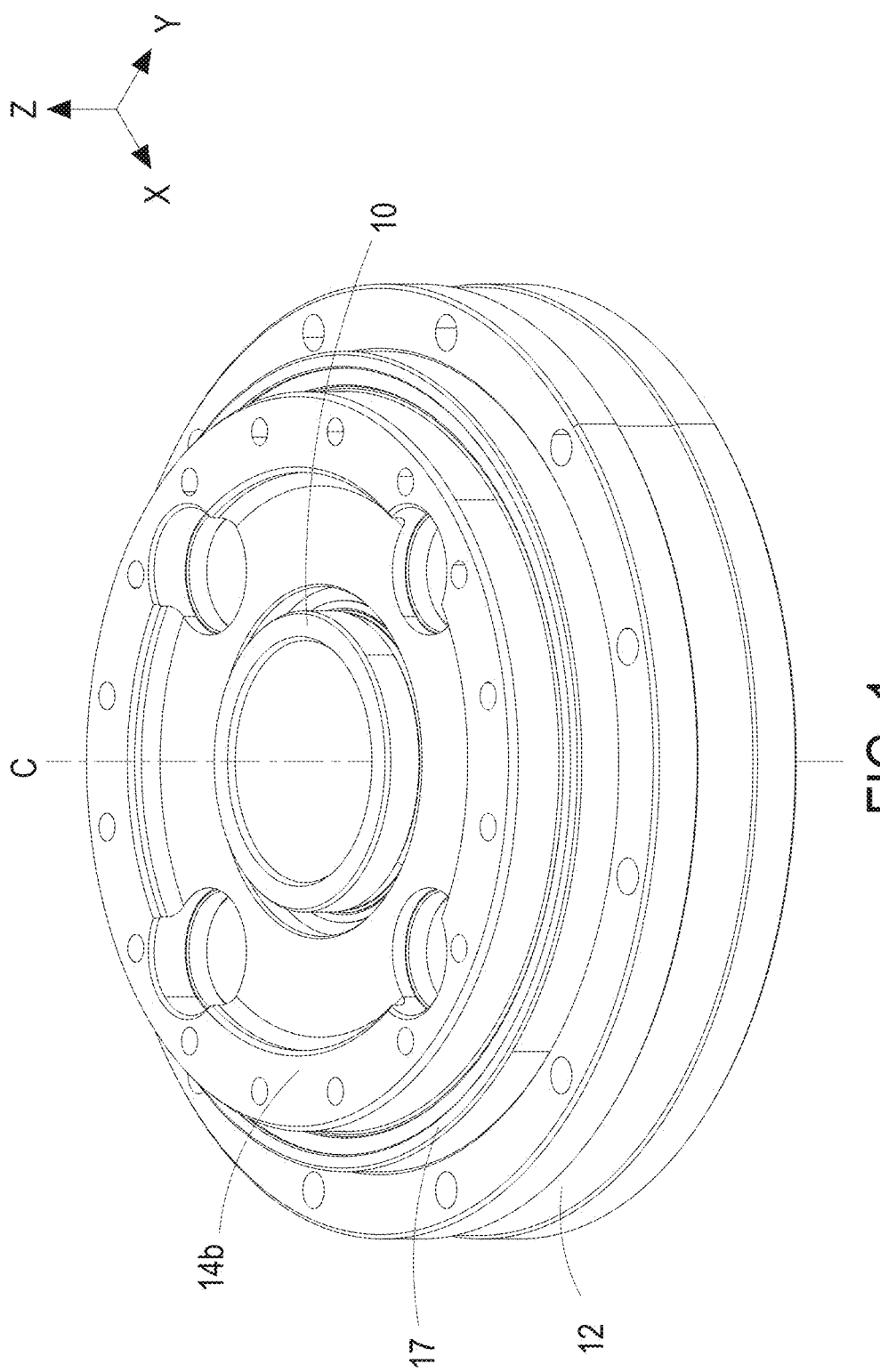
FIG. 1 is a perspective view illustrating a cycloid speed reducer according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "front," "rear" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

Figure 2:
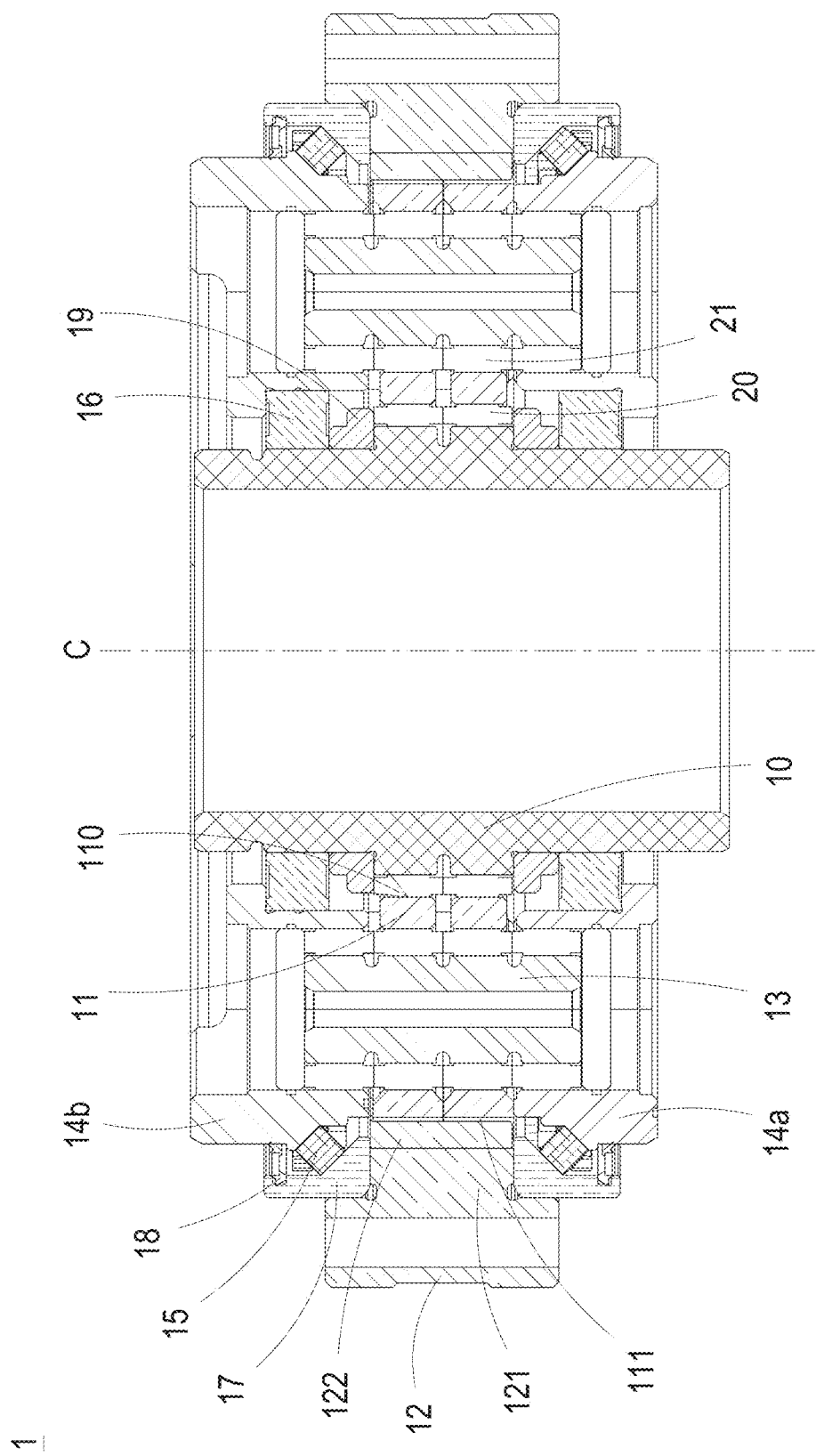
FIG. 2 is a cross-sectional view illustrating the cycloid speed reducer according to the embodiment of the present disclosure.

FIG. 1 is a perspective view illustrating a cycloid speed reducer according to an embodiment of the present disclosure. FIG. 2 is a cross-sectional view illustrating the cycloid speed reducer according to the first embodiment of the present disclosure. Please refer to FIG. 1 and FIG. 2. The present disclosure provides a cycloid speed reducer 1. Preferably but not exclusively, the cycloid speed reducer 1 can be applied to motors, machine tools, robotic arms, automobiles, motorcycles or other power assisting devices in order to provide a speed reducing function. In the embodiment, the cycloid speed reducer 1 includes an input shaft 10, a cycloidal gear plate 11, an eccentric transmission shaft 13, a first output plate 14a, a second output plate 14b and a roller wheel assembly 12. The roller wheel assembly 12 includes a wheel disc 121 and a plurality of rollers 122. The wheel disc 121 includes a shaft hole (not shown), which is located at the substantial center position of the wheel disc 121 for a part of the input shaft 10 to pass through. Moreover, the wheel disc 121 is driven by the input shaft 10 to rotate. The plurality of rollers 122 are disposed on the wheel disc 121. The input shaft 10 is arranged along an axial direction C. Preferably but not exclusively, the input shaft 10 is configured to receive a power input provided by, for example, a motor (not shown), and is driven to rotate by the power input. The cycloidal gear plate 11 includes a shaft hole 110 and an outer tooth portion 111. The shaft hole 110 is located at the substantial center position of the cycloidal gear plate 11 and spatially corresponding to the input shaft 10 in arrangement position. The shaft hole 110 is passed through by a part of the input shaft 10, so that the cycloidal gear plate 11 is sleeved on the input shaft 10. When the input shaft 10 is rotated, the cycloidal gear plate 11 is driven by the input shaft 10 to rotate. The roller wheel assembly 12 is sleeved on the cycloidal gear plate 11 and includes the plurality of rollers 122 spatially corresponding to the outer tooth portion 111 of the cycloidal gear plate 11. Preferably but not exclusively, the outer tooth portion 111 can be protruded from an outer periphery of the cycloidal gear plate 11. Moreover, the outer tooth portion 111 of the cycloidal gear plate 11 is in contact with the corresponding rollers 122 of the roller wheel assembly 12. When the power input provided by the motor is inputted through the input shaft 10, the outer tooth portion 111 of the cycloidal gear plate 11 is driven directly to engage with the corresponding rollers 122 of the roller wheel assembly 12.

In the embodiment, the cycloidal gear plate 11 is connected to the input shaft 10 through a needle bearing 20, and connected to the eccentric transmission shaft 13 through a needle bearing 21, respectively. Preferably but not exclusively, the eccentric transmission shaft 13 is a crankshaft including four eccentric sections with the same diameter, and there are five eccentric transmission shaft 13 in the cycloid speed reducer 1. Each transmission shaft 13 includes two concentric ends disposed at two opposite ends thereof and two eccentric ends arranged between the two concentric ends. The two eccentric ends are spatially corresponding to the cycloidal gear plate 11. When the cycloid gear plate 11 is driven by the input shaft 10 to rotate, the cycloidal gear plate 11 drives the eccentric transmission shaft 13 to rotate by connecting with the eccentric ends of the eccentric transmission shaft 13. In that, the concentric ends of the eccentric transmission shaft 13 are rotated synchronously, and the first output plate 14a and the second output plate 14b are driven by the concentric ends of the eccentric transmission shaft 13 to rotate respectively. The first output plate 14a and the second output plate 14b are located at two opposite outer ends of the cycloid speed reducer 1. Preferably but not exclusively, the first output plate 14a is disposed adjacent to the motor and can be regarded as the rear end of the cycloid speed reducer 1, and the second output plate 14b is disposed at another opposite end and regarded as the front end of the cycloid speed reducer 1. Certainly, the present disclosure is not limited thereto. In the embodiment, at least one of the first output plate 14a and the second output plate 14b can be used as the power output of the cycloid speed reducer 1.

In the embodiment, the first output plate 14a and the second output plate 14b are located at two opposite sides of the roller wheel assembly 12. In that, the cycloidal gear plate 11 is located between the first output plate 14a and the second output plate 14b. Preferably but not exclusively, both of the first output plate 14a and the second output plate 14b are served as the output end of the cycloid speed reducer 1 to provide the power output. In the embodiment, there are two sets of roller bearings 15, one set is arranged between the first output plate 14a and one side of the roller wheel assembly 12, and another set is arranged between the second output plate 14b and another opposite side of the roller wheel assembly 12. Two track bases 17 are disposed on two opposite sides of the wheel disc 121 of the roller wheel assembly 12, respectively. The two track bases 17 are spatially corresponding to the first output plate 14a and the second output plate 14b, respectively, and a parallelogram is collaboratively formed on a radial section so that the plurality of rollers in two sets of bearing rollers 15 are configured to run between the track base 17 and the first output plate 14a and between the track base 17 and the second output plate 14b.

Figure 3:
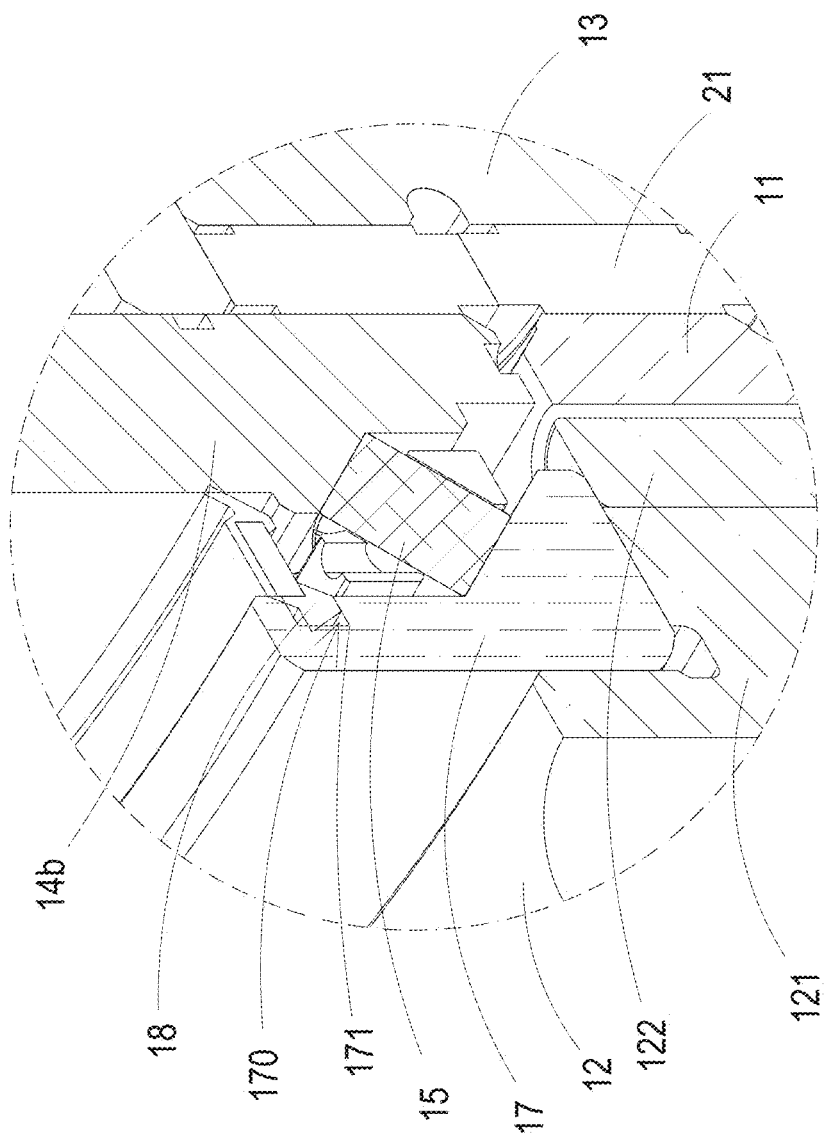
FIG. 3 is a cross-sectional structural view illustrating the portion of the cycloid speed reducer adjacent to the track bases according to the embodiment of the present disclosure.

Notably, in order to further realize the miniaturization, the design of the cycloid speed reducer 1 in the present disclosure further omits the conventional front-end and rear-end cover structures for sealing grooves. FIG. 3 is a cross-sectional structural view illustrating the portion of the cycloid speed reducer adjacent to the track bases according to the embodiment of the present disclosure. Taking the second output plate 14b as an example, the track base 17 is further extended outward along the outer peripheral wall of the second output plate 14b to form an accommodation space 170, which is configured to receive a sealing element 18. Through the accommodation space 170 formed by the track base 17, the sealing element 18 is tightly fitted between the track base 17 and the second output plate 14b to achieve the front end sealing of the cycloid speed reducer 1. Similarly, the track base 17 and the sealing element 18 mentioned above can be disposed correspondingly to the first output plate 14a, so that the rear end sealing of the cycloid speed reducer 1 is realized. Certainly, the manner in which the sealing element 18 is tightly fitted between the track base 17 and the first output plate 14a or between the track base 17 and the second output plate 14b can be adjusted according to the practical requirements. Preferably but not exclusively, the sealing element 18 is a sealing ring structure. The track base 17 further includes a groove 171 spatially corresponding to the accommodation space 170. The groove 171 is ring-shaped on an inner peripheral wall of the track base 17 and configured to engage with an outer peripheral edge of the sealing element 18. Certainly, the present disclosure is not limited thereto. Compared with the traditional sealing method of covering the ring teeth disk of the reducer with the front end cover and rear end cover installed, the accommodation space 170 for the seal element 18 is integrated into the track base 17, and the traditional end cover design can be omitted. It has higher flexibility in application. Certainly, the present disclosure is not limited thereto.

In the embodiment, the input shaft 10 is directly driven by the power source input from the motor (not shown), so that the cycloidal gear plate 11 and the roller wheel assembly 12 are interacted with each other. Therefore, the stability of the input source is extremely important. In order to ensure the stability of the input shaft 10, the arrangement of deep grove bearings 16 is used to eliminate backlash and generate pre-pressure in the present disclosure. In the embodiment, the input shaft 10 and the first output plate 14a or/and the second output plate 14b are connected through the deep groove bearings 16. The cooperation between the shaft hole of the deep groove bearings 16 and the input shaft 10 is mainly an interference fit, so as to ensure the stability of the input shaft 10. However, the deep groove bearings 16 typically have large tolerances, and the accumulation of excessive tolerance values will not ensure that the assembled deep groove bearings 16 can generate overpressure to achieve the effects of eliminating backlash or generating pre-pressure. Therefore, in the present disclosure, a thickness of a spacer ring 19 is used to adjust the clearances, so as to solve the cumulative tolerance problem that is difficult to control in the bearings.

Figure 4:
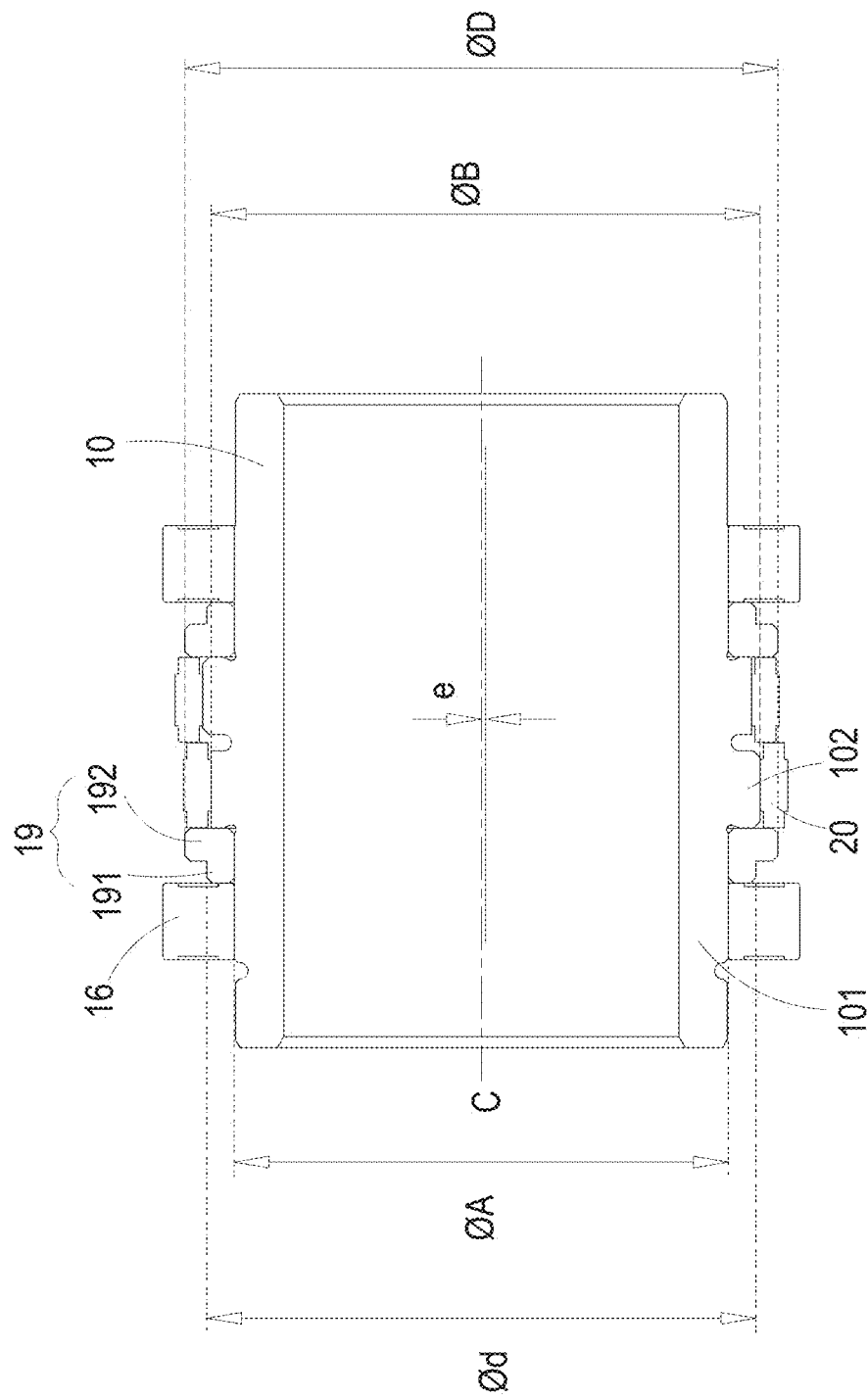
FIG. 4 is a cross-sectional view illustrating the dimensional relationship between the bearing, the spacer ring and the input shaft in the cycloid speed reducer of the embodiment of the present disclosure.
Figure 5:
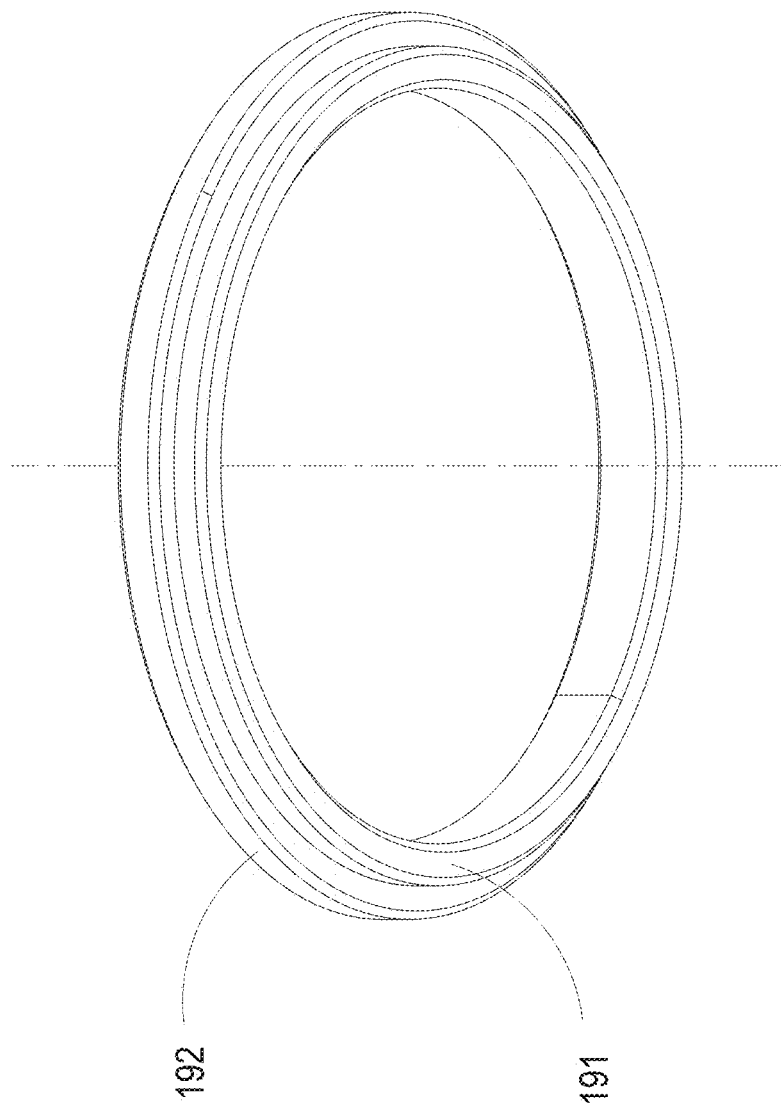
FIG. 5 is a perspective view illustrating the spacer ring of the cycloid speed reducer according to the first embodiment of the present disclosure.

FIG. 4 is a cross-sectional view illustrating the dimensional relationship between the bearing, the spacer ring and the input shaft in the cycloid speed reducer of the embodiment of the present disclosure. FIG. 5 is a perspective view illustrating the spacer ring of the cycloid speed reducer according to the embodiment of the present disclosure. Please refer to FIG. 1 to FIG. 5. In the embodiment, the input shaft 10 includes a deep-groove-bearing connection section 101 and a needle-bearing connection section 102. The deep groove bearings 16 are connected the deep-groove-bearing connection section 101 and the first output plate 14a/the second output plate 14b. The needle bearing 20 is connected between the needle-bearing connection section 102 and the cycloidal gear plate 11. In the embodiment, the spacer ring 19 includes a first spacer section 191 and a second spacer section 192, which are connected to each other along the axial direction C to form a stepped structure. An outer rings of the bearings 16 interfere with the first output plate 14a and the second output plate 14b, respectively. An inner ring of the deep groove bearing 16 interferes with the first spacer section 191 of the spacer ring 19 for bearing, and the second spacer section 192 of the spacer ring 19 interferes with the needle-bearing connection section 102 of the input shaft 10 for bearing. In the embodiment, the first spacer section 191 has a first spaced outer diameter Ød that is less than a second spaced outer diameter ØD of the second spacer section 192. In the embodiment, the deep-groove-bearing connection section 101 connected to the deep groove bearing 16, and has a deep-groove-bearing inner diameter ØA. The needle-bearing connection section 102 connected to the needle bearing 20 has a needle-bearing inner diameter ØB, and an eccentricity value e is formed by the relative distance between the central axis of the needle-bearing connection section 102 and the central axis of the deep-groove-bearing connection section 101. In the embodiment, in order to ensure that the assembled deep groove bearings 16 can generate overpressure to achieve the effect of eliminating backlash or generating pre-pressure, the size of the spacer ring 19 is further designed to match the size of the input shaft 10. In the embodiment, the first spaced outer diameter Ød is greater than the sum of the deep-groove-bearing inner diameter ØA and a processing thickness. Preferably but not exclusively, the processing size is measured in mm, and the processing thickness can be for example 1.5 mm. Moreover, the first spaced outer diameter ØA is less than or equal to the needle-bearing inner diameter ØB, as shown in the following equation (1). In the embodiment, the second spaced outer diameter ØD is greater than the sum of the first spaced outer diameter Ød and 2 times the eccentricity value e, and is less than or equal to the sum of the needle-bearing inner diameter ØB, the difference between the needle-bearing inner diameter ØB and the deep-groove-bearing inner diameter ØA and 2 times the eccentricity value e, as shown in the following equation (2).

$$ØA + \text{processing thickness} < Ød \leq ØB \quad (1)$$

$$Ød + 2e < ØD \leq ØB + (ØB - ØA) + 2e \quad (2)$$

Certainly, the size design of the spacer ring 19 is adjustable according to the sizes of the deep groove bearings 16, the first output plate 14a or the second output plate 14b or the practical requirements, and the present disclosure is not limited thereto. In addition, notably, since the deep groove bearings 16 of the present disclosure are disposed inside the reducer, compared to the conventional structure in which the bearing is arranged on an aluminum cover, the structure of the input shaft 10 of the cycloid speed reducer 1 in the present disclosure has higher stability. The cycloid speed reducer 1 of the present disclosure will not have problems such as thermal expansion and interference forces caused by the bearing connected to the aluminum cover.

Figure 6:
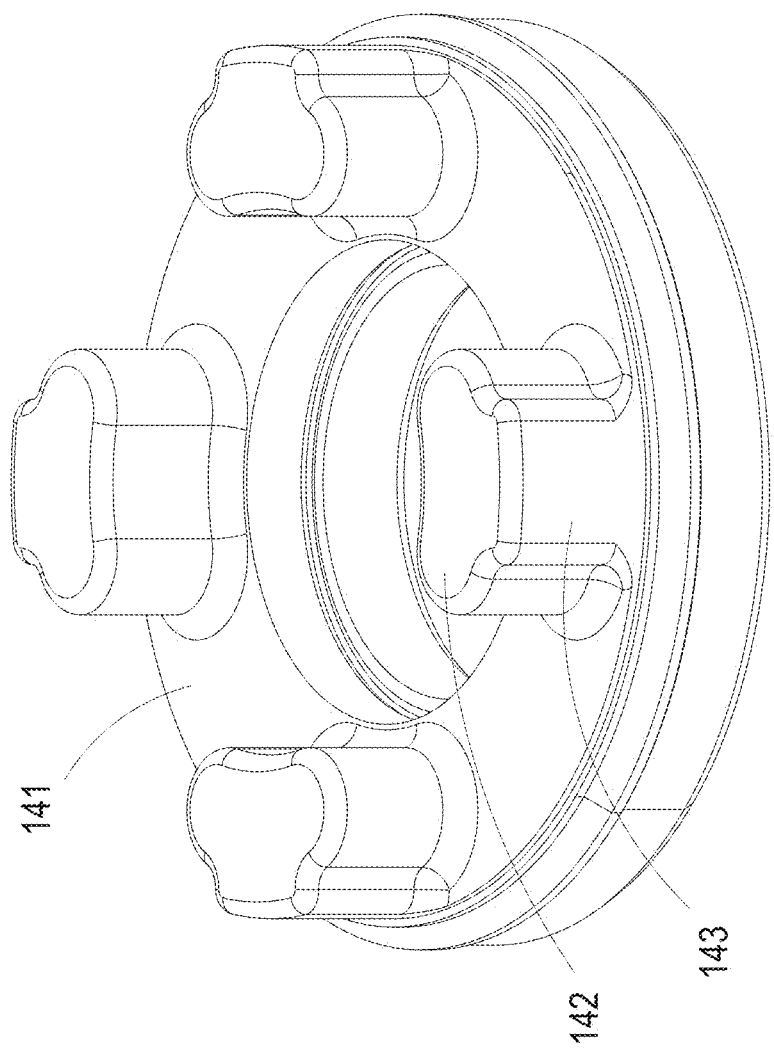
FIG. 6 is a perspective view illustrating an initial shape of the first output plate in the cycloid speed reducer before milling according to the first embodiment of the present disclosure.
Figure 7:
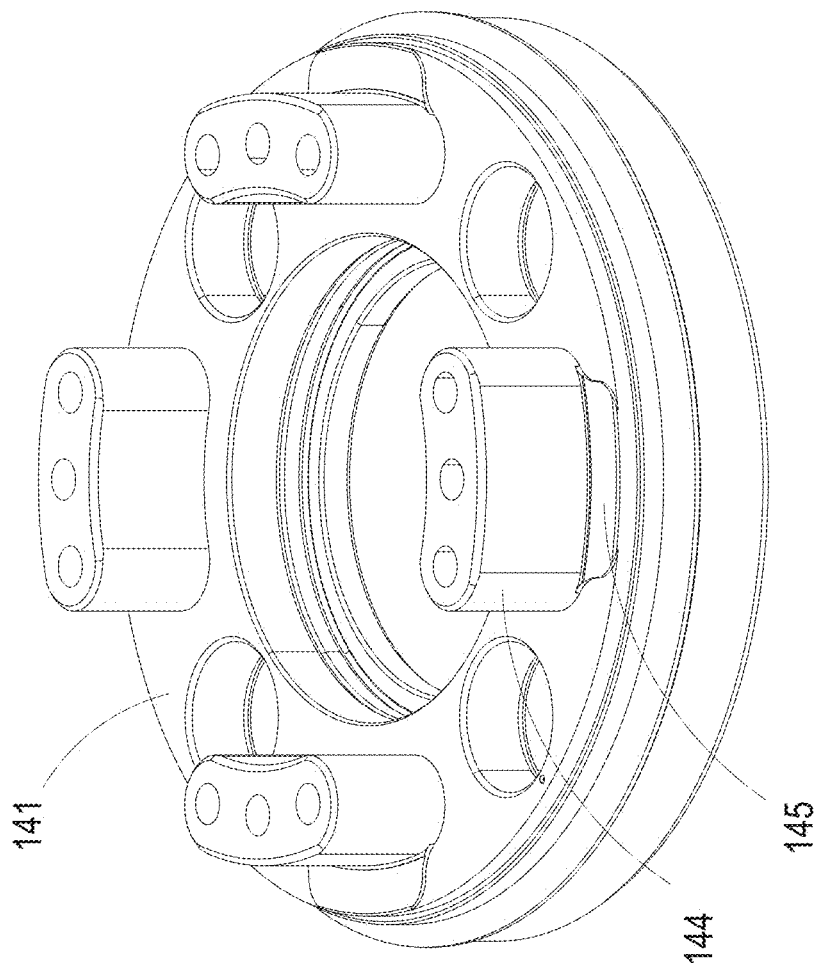
FIG. 7 is a perspective view illustrating the shape of the first output plate in the cycloid speed reducer after milling according to the first embodiment of the present disclosure.
Figure 8:
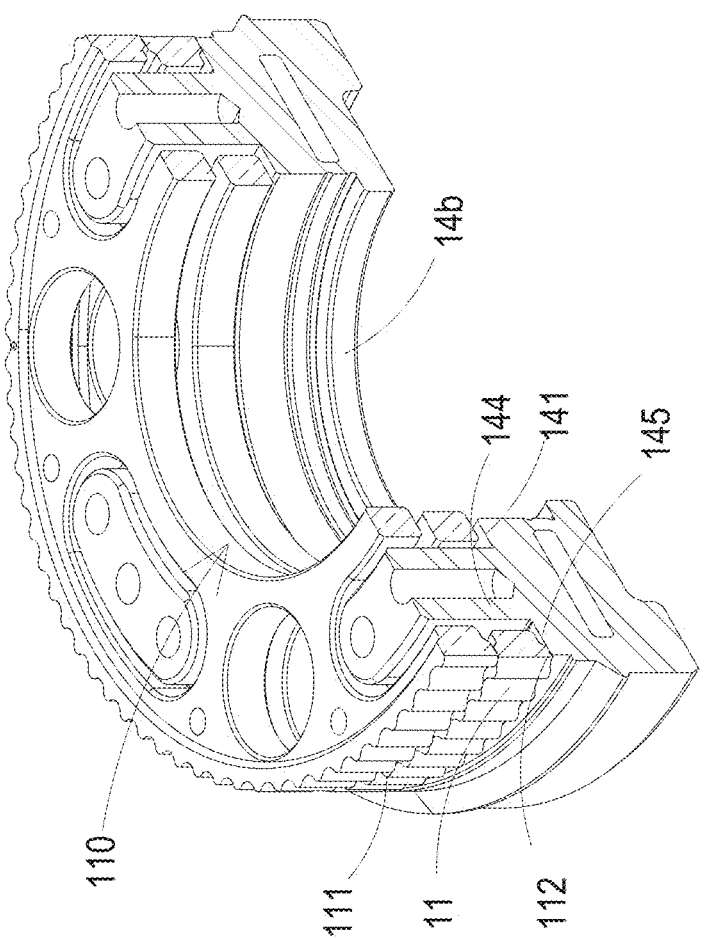
FIG. 8 is a cross-sectional structural view illustrating the first output plate supporting the cycloid gear plate in the cycloid speed reducer according to the first embodiment of the present disclosure.

On the other hand, some parts of the cycloid speed reducer 1 have processing cost issues. In addition to high-precision requirements, the structure of some parts is also relatively complex. FIG. 6 is a perspective view illustrating an initial shape of the first output plate in the cycloid speed reducer before milling according to the embodiment of the present disclosure. FIG. 7 is a perspective view illustrating the shape of the first output plate in the cycloid speed reducer after milling according to the embodiment of the present disclosure. FIG. 8 is a cross-sectional structural view illustrating the first output plate supporting the cycloid gear plate in the cycloid speed reducer according to the embodiment of the present disclosure. In the embodiment, the first output plate 14a is usually a disk-shaped workpiece with several protruding structures. In mass production of such special-shaped workpiece, production molding strategies can only be adopted to reduce costs. Furthermore, after production molding, it is necessary to control the dimensional accuracy through machine processing. In the traditional machine processing method, too many surfaces need to be processed. The benefits of production molding cannot be increased. The position-limitation of the cycloidal gear plate 11 in the cycloid reducer 1 usually relies on for example the first output plate 14a to act as the supporting and limiting parts. For the conventional output plate, the detailed processing and milling are necessary after production molding to ensure the accuracy of the bearing surface. The milling region needs to surround the entire circle of the output plate to ensure accuracy, so that a heavy cost is required. In the embodiment, the raw material 140 for the first output plate 14a is shown in FIG. 6. The protruding structures 142 are further respectively connected to milling outreach structures 143 and formed on the datum plane 141 to increase the thickness of the protruding structures 142. The raw material 140 can be produced by molding. Thereafter, the fine structure of the first output plate 14a, as shown in FIG. 7, can be obtained through low-cost lathe processing. In the embodiment, the processing thickness of the protruding structures 142 is increased through the milling outreach structures 143. After the milling outreach structures 143 are removed by milling, a plurality of supporting planes 145 are formed for the cycloidal gear plate 11. The supporting planes 145 are higher than a datum plane 141 and spatially corresponding to the protruding structures 144 connected therewith. The plurality of supporting planes 145 are spaced apart from each other. In this way, the bottom surface 112 of the cycloidal gear plate 11 is accurately supported on the supporting planes 145, as shown in FIG. 8. Compared with the conventional processing method of milling the entire surface, the thickness next to the protruding structures 142 in the present disclosure is increased respectively with the milling outreach structures 143 through mass production molding. It avoids the problem caused by full-circle milling, and the processing hours are reduced significantly. In this way, by optimizing the aforementioned component structure, the cycloid speed reducer 1 of the present disclosure not only achieves miniaturization application, but also saves the material and manufacturing costs. Certainly, the present disclosure is not limited thereto.

From the above, it can be seen that the cycloidal speed reducer 1 of the present disclosure utilizes the design of the front-end and rear-end sealing element 18 and omits the conventional end cover design. It helps to save the material costs and significantly reduce the overall volume of the cycloid speed reducer 1. Furthermore, with the spacer ring 19 placed between the front bearing and the rear bearing, it allows to prevent the front bearing and the rear bearing of the input shaft 10 from affecting the transmission due to installation clearance errors, and the thickness of the spacer ring 19 can be used to adjust the clearances of the front bearing and the rear bearing to facilitate the quantitative production and control the yield. Since the cycloid speed reducer 1 of the present disclosure provides the front output end and the rear output end at two opposite ends, it is more conducive to the assembly and application of miniaturized structures. For example, when the rear output end of the cycloid speed reducer 1 of the present disclosure is assembled with the motor, it facilitates to arrange an encoder between the speed reducer and the motor for closed-loop feedback control, so as to improve the control accuracy of the system. The application of the cycloid speed reducer assembly equipped with encoder feedback is generally applicable to general standard servo motors, and is competitive in terms of cost and convenience. Certainly, the applications of the cycloid speed reducer 1 are not limited thereto, and not redundantly described hereafter.

In summary, the present disclosure provides a cycloid speed reducer optimizing the component structure to realize the miniaturization application. In order to achieve the sealing design of the front end and the rear end of the cycloid speed reducer of the present disclosure, the accommodation space required for the sealing element is integrated into the track ring, and the traditional end cover design is omitted to save the material costs and significantly reduce the overall volume of the cycloid speed reducer. Moreover, in order to prevent the front bearing and the rear bearing of the input shaft from affecting the transmission due to installation clearance errors, a spacer ring is placed between the front bearing and the rear bearing, and the thickness of the spacer ring can be used to adjust the clearances of the front bearing and the rear bearing to facilitate the quantitative production and control the yield. On the other hand, the position-limitation of the gear plate in the cycloid reducer usually relies on the output plate or the track ring to act as the supporting and limiting parts. In the present disclosure, the initial shape of the output plate is adjusted through mass production molding, and the thickness next to the protruding structures of the output plate is increased, so that the supporting planes can be milled through a lower-cost lathe processing, and the accuracy of supporting plane can meet the requirements. There is no need to perform full-circle milling on the output plate, and the processing hours are reduced significantly. In this way, by optimizing the aforementioned component structure, the cycloid speed reducer of the present disclosure not only achieves miniaturization application, but also saves the material and manufacturing costs.

While the disclosure has been described in terms of what is presently considered to be the most practical and preferred embodiments, it is intended to cover various modifications and similar arrangements included within the spirit and scope of the appended claims which are to be accorded with the broadest interpretation so as to encompass all such modifications and similar structures.

What is claimed is:

1. A cycloid speed reducer, comprising:
an input shaft arranged along an axial direction;
a cycloidal gear plate comprising a shaft hole and an outer tooth portion, wherein the shaft hole passes through the cycloidal gear plate along the axial direction, and is configured to be passed through by the input shaft, and the outer tooth portion is disposed on an outer periphery of the cycloidal gear plate;
a roller wheel assembly sleeved on the cycloidal gear plate and comprising a plurality of rollers spatially corresponding to the outer tooth portion of the cycloidal gear plate;
an output plate connected to the cycloidal gear plate through an eccentric transmission shaft, wherein when the input shaft drives the outer tooth portion of the cycloidal gear plate to engage with the corresponding rollers of the roller wheel assembly, the cycloid gear plate is rotated with the eccentric transmission shaft, so that the output plate is driven by the eccentric transmission shaft to rotate;
a track base disposed on an outer side of the roller wheel assembly, and spatially corresponding to an outer peripheral wall of the output plate, wherein the track base is extended outward along the outer peripheral wall of the output plate to form an accommodation space between the track base and the outer peripheral wall of the output plate; and
a sealing element received within the accommodation space and tightly fitted between the track base and the output plate, wherein the output plate comprises a plurality of protruding structures and a plurality of supporting planes, the plurality of protruding structures are disposed on a datum plane, and the plurality of supporting planes are correspondingly connected to the plurality of protruding structures and higher than the datum plane, wherein the plurality of supporting planes are formed after a plurality of milling outreach structures for increasing thickness of the plurality of protruding structures are removed through milling, and the plurality of supporting planes are spaced apart from each other and configured to support a bottom surface of the cycloidal gear plate.

2. The cycloid speed reducer according to claim 1, further comprising a roller bearing, wherein the roller bearing is arranged between the output plate and the track base, and comprises a plurality of rollers configured to run between the track base and the output plate.

3. The cycloid speed reducer according to claim 2, wherein the track base is spatially corresponding to the output plate, and a parallelogram is collaboratively formed on a radial section so that the plurality of rollers of the bearing roller are configured to run between the track base and the output plate.

4. The cycloid speed reducer according to claim 1, wherein the track base comprises a groove, which is ring-shaped on an inner peripheral wall of the track base and configured to engage with an outer peripheral edge of the sealing element.

5. The cycloid speed reducer according to claim 1, further comprising a deep groove bearing, a needle bearing and a spacer ring, wherein the input shaft includes a deep-groove-bearing connection section and a needle-bearing connection section, the deep groove bearing is connected between the deep-groove-bearing connection section and the output plate, the needle bearing is connected between the needle-bearing connection section and the cycloidal gear plate, and the deep groove bearing and the needle-bearing connection section are connected through the spacer ring.

6. The cycloid speed reducer according to claim 5, wherein the spacer ring comprises a first spacer section and a second spacer section connected to each other along the axial direction to form a stepped structure.

7. The cycloid speed reducer according to claim 6, wherein an inner ring of the deep groove bearing interferes with the first spacer section for bearing, and the second spacer section interferes with the needle-bearing connection section for bearing.

8. The cycloid speed reducer according to claim 6, wherein the first spacer section has a first spaced outer diameter, the second spacer section has a second spaced outer diameter, and the first spaced outer diameter is less than the second spaced outer diameter.

9. The cycloid speed reducer according to claim 8, wherein the deep-groove-bearing connection section has a deep-groove-bearing inner diameter, the needle-bearing connection section connected to the needle bearing has a needle-bearing inner diameter, and an eccentricity value is formed by the relative distance between a central axis of the needle-bearing connection section and a central axis of the deep-groove-bearing connection section, wherein the first spaced outer diameter is greater than the sum of the deep-groove-bearing inner diameter and 1.5 mm, and is less than or equal to the needle-bearing inner diameter, wherein the second spaced outer diameter is greater than the sum of the first spaced outer diameter and 2 times the eccentricity value, and is less than or equal to the sum of the needle-bearing inner diameter, the difference between the needle-bearing inner diameter and the deep-groove-bearing inner diameter and 2 times the eccentricity value.

10. The cycloid speed reducer according to claim 1, wherein the output plate comprises a first output plate and a second output plate, the first output plate and the second output plate are respectively located on two opposite outer sides of the roller wheel assembly, and each provides a power output, respectively.

\* \* \* \* \*